United States Patent
Barrett et al.

(10) Patent No.: US 9,457,337 B2
(45) Date of Patent: Oct. 4, 2016

(54) ADSORBENT COMPOSITION FOR ARGON PURIFICATION

(71) Applicants: Philip A. Barrett, Tonawanda, NY (US); Steven J. Pontonio, Eden, NY (US); Neil A. Stephenson, East Amherst, NY (US); Persefoni E. Kechagia, Williamsville, NY (US)

(72) Inventors: Philip A. Barrett, Tonawanda, NY (US); Steven J. Pontonio, Eden, NY (US); Neil A. Stephenson, East Amherst, NY (US); Persefoni E. Kechagia, Williamsville, NY (US)

(73) Assignee: PRAXAIR TECHNOLOGY, INC., Danbury, CT (US)

( * ) Notice: Subject to any disclaimer, the term of this patent is extended or adjusted under 35 U.S.C. 154(b) by 619 days.

(21) Appl. No.: 13/782,682

(22) Filed: Mar. 1, 2013

(65) Prior Publication Data

US 2014/0249023 A1 Sep. 4, 2014

(51) Int. Cl.
*B01J 20/18* (2006.01)
*C01B 23/00* (2006.01)

(52) U.S. Cl.
CPC .......... *B01J 20/186* (2013.01); *C01B 23/0068* (2013.01); *C01B 23/0078* (2013.01); *C01B 2210/0034* (2013.01); *C01B 2210/0045* (2013.01)

(58) Field of Classification Search
None
See application file for complete search history.

(56) References Cited

U.S. PATENT DOCUMENTS

| | | | |
|---|---|---|---|
| 3,996,028 A | 12/1976 | Golovko et al. | |
| 4,477,265 A | 10/1984 | Kumar et al. | |
| 4,717,406 A | 1/1988 | Giacobbe | |
| 5,159,816 A | 11/1992 | Kovak et al. | |
| 5,174,979 A | 12/1992 | Chao et al. | |
| 5,601,634 A | 2/1997 | Jain et al. | |
| 5,685,172 A | 11/1997 | Darredeau et al. | |
| 5,730,003 A | 3/1998 | Nguyen et al. | |
| 5,784,898 A | 7/1998 | Gary | |
| 6,083,301 A | 7/2000 | Gary et al. | |
| 6,572,838 B1 | 6/2003 | Sebastian et al. | |
| 7,294,172 B2 | 11/2007 | Baksh et al. | |

(Continued)

FOREIGN PATENT DOCUMENTS

| DE | 2243389 A1 | * | 1/1999 | ............ B01D 53/02 |
|---|---|---|---|---|
| EP | 0 514 163 A2 | | 11/1992 | |
| EP | 0 893 156 A2 | | 1/1999 | |
| EP | 1 291 067 A2 | | 3/2003 | |
| JP | WO 2011024687 A1 | * | 3/2011 | ............ B01D 15/00 |

OTHER PUBLICATIONS

Federov, A.N., Investigation and Improvement of Cryogenic Adsorption Purification of Argon from Oxygen Gas Separation & Purification, vol. 9, No. 2, pp. 137-145, XP055121716, ISSN: 0950-4214, DOI: 10.1016/0950-4214(95)93951-F.

*Primary Examiner* — Colin W Slifka
(74) *Attorney, Agent, or Firm* — Praxair, Inc.

(57) ABSTRACT

An optimal material composition that allows for the purification of at least one feed component from a fluid feed stream such that the adsorbent has an oxygen capacity of at least 10 weight percent is described. More specifically, the material is an adsorbent for purification of a fluid feed stream having an oxygen to argon selectivity greater than or equal to a ratio of 3:1 and an oxygen capacity of greater than or equal to 10 weight percent, wherein the oxygen capacity is measured at a pressure in the range of about 9-10 Torr and a temperature of 77 degrees Kelvin after 4 hours of equilibration time and wherein the oxygen to argon selectivity is obtained by dividing the oxygen capacity by the argon capacity of the adsorbent measured at a pressure in the range of about 697-700 Torr and a temperature of 87 degrees Kelvin after 8 hours of equilibration time. The adsorption capacities are measured on a pure component basis.

25 Claims, 3 Drawing Sheets

(56) References Cited

U.S. PATENT DOCUMENTS

| | | |
|---|---|---|
| 7,452,407 B2 | 11/2008 | Golden et al. |
| 7,501,009 B2 | 3/2009 | Graham et al. |
| 2012/0141868 A1* | 6/2012 | Hirano .................. B01D 15/00 429/188 |
| 2014/0245781 A1 | 9/2014 | Kechagia et al. |
| 2014/0245782 A1 | 9/2014 | Barrett et al. |

\* cited by examiner

ADSORBENT COMPOSITION FOR ARGON PURIFICATION

FIELD OF THE INVENTION

The present invention relates to the use of specially prepared adsorbent compositions for cyclic adsorption processes primarily designed to remove oxygen during the purification of argon. More specifically, the invention relates to development of a lithium ion-exchanged adsorbent that provides the required separation and purification of oxygen from argon while argon is in either the liquid or gas phase. The adsorbent is best utilized in an adsorbent bed which can be integrated with an air separation plant or unit (ASU) in order to achieve optimal purification processing. The adsorbent composition used for separation of at least one feed component from the fluid feed stream is a zeolite that is partially ion exchanged with 15 to 86 percent lithium on a charge equivalent basis to create molecular sieve adsorbents having a pore size smaller than type 4A and larger than type 3A zeolites.

BACKGROUND

Successful purification of a liquid or gaseous argon requires removal of low concentration (i.e., in the range of parts per million) of oxygen from argon. The removal of up to 1 percent of oxygen from argon is considered to be a purification process and is necessary for many end users of argon where the presence of oxygen in the argon is undesirable. In many instances where safety, handling, and the industrial or laboratory use of argon in either a liquid or gaseous state occurs, the purity of argon is important. Argon is colorless, odorless, and nontoxic as a solid, liquid, and gas. Argon is chemically inert under most conditions. As an inert noble gas, it possesses special properties desirable for applications related to the semi-conductor industry, for lighting, welding and other high-temperature industrial processes where ordinarily non-reactive substances can become reactive. Oxygen, in contrast to argon, is a highly reactive substance (in gaseous or liquid form) and is often a safety concern in that it supports combustion. Even low levels of oxygen (<100 parts per million) are many times not acceptable for certain laboratory and industrial processes. This also includes the chemical processing industry where certain reactions must be carried out, primarily in the absence of oxygen.

Cost considerations for the purification of argon have been a driving influence in the development of special cryogenic systems over at least several decades, and finding the proper process which is robust, reliable, and meets the economic criteria necessary to meet customer demand at an acceptable price has been challenging. These challenges have been the focus of several other investigators. Production of liquid argon via cryogenic distillation is well known and is the preferred method for producing high purity argon.

Adsorption processes can also be used to achieve the required purification and are reported in the literature. However, most of the related art is focused on the purification of gaseous streams. Liquid argon (rather than gaseous argon) is more easily transported to the customer location and once the customer receives the liquid argon, the conversion to the gaseous state is easily achieved. Therefore, it is desirable to keep argon in the liquid form during and after the purification process. Finding a suitable adsorbent to accomplish this task, primarily in the liquid phase, is one major focus of this disclosure.

In the related art, U.S. Pat. No. 3,996,028 describes a VPSA process for the purification of argon from oxygen. The argon is passed through a bed of synthetic zeolites of the A type and the oxygen is adsorbed on the zeolite. Thereafter, regeneration is caused by decreasing the bed pressure and ultimately using vacuum. This patent claims the use of any form of zeolite A with an entry void diameter of 2.8 to 4.2 Å (angstroms). According to this document, ion exchanged forms of zeolite A can be used to decrease the entry void diameter and in addition allows for altering the working temperature and pressure range of the purification process. There is no teaching in the disclosure regarding the benefit of varying the entry void diameter within the range of 2.8 to 4.2 Å other than the ability to operate under different temperature and pressure conditions. Moreover, it is not clear how the entry void diameter parameter was determined. One skilled in the art will recognize that this parameter is not simple to measure. Ion exchanged zeolite A compositions are also disclosed which have entry void diameters within the 2.8 to 4.2 Å claimed range including, greater than 10 percent lithium ion exchanged zeolite A. The disclosure also does not describe a maximum ion exchange level for lithium within the adsorbent, and does not describe nor define the combined importance of creating adsorbent compositions having the proper oxygen capacity, argon capacity, and oxygen to argon selectivity for purification purposes.

U.S. Pat. No. 4,477,265 describes the recovery of argon from a gas stream containing nitrogen and oxygen by passing the gas stream through a first bed containing an adsorbent with equilibrium selectivity for nitrogen and subsequently passing the stream through a physically separate adsorbent bed using kinetic selectivity for oxygen adsorption. This document describes the use of a carbon molecular sieve, as the preferred adsorbent, with a selectivity favoring oxygen over argon. While there is no selectivity at true equilibrium, this disclosure proposes using a short contact time of the gas with the adsorbent. This would allow oxygen to adsorb onto the adsorbent, but provide insufficient time for the argon to adsorb.

U.S. Pat. No. 5,159,816 describes a process for preparing high purity argon using cryogenic adsorption by removal of nitrogen and oxygen using a molecular sieve suited to physical nitrogen adsorption and likewise a molecular sieve suited to the physisorption of oxygen. Concerning the adsorbent selection, it is claimed that 4A zeolite should be used in the adsorbent bed for oxygen removal from argon, and a 5A molecular sieve be used for removal of nitrogen. In the specification, representative molecular sieves for nitrogen and oxygen are identified as 5A, 4A, Mordenite, 13X, Chabazite, Erionite and ion exchanged variants using cations other than Na, including K, Li and Ca. In the subject disclosure, no specific adsorption characteristics for oxygen and argon are taught. Additionally, the relationship between performance, adsorbent type, and composition is neither described nor discussed in this patent, but instead a very diverse list of zeolite structures and cation types are claimed.

U.S. Pat. No. 5,601,634 describes a process for removing nitrogen and oxygen from an argon stream. The patent describes a two-step process where one type of adsorbent is used to remove nitrogen using a temperature swing adsorption process (TSA), and a second bed is then employed to remove oxygen. The oxygen removal bed, utilizes carbon molecular sieve (CMS) or 4A type zeolite. The adsorbent characteristics for effective oxygen removal from argon, as taught in the present disclosure are not met by Zeolite 4A.

The broad pore size distribution of a CMS is expected to rule out the use of this adsorbent for the required process described herein. In comparison with U.S. Pat. No. 4,477,265, discussed above, short cycles were necessary for CMS, whereas the high performance of the adsorbents of the present invention enable long cycle times to be achieved.

U.S. Pat. No. 5,784,898 describes a process for the preparation of a fluid, including liquid argon which is purified from impurities—including oxygen. The adsorbent is selected from a group consisting of various natural and synthetic zeolites, optionally ion exchanged with different cations, and porous metal oxides. Hopcalite, a mixed metal oxide, is specifically identified as being effective for purifying carbon monoxide and oxygen simultaneously. This document demonstrates a lack of definition regarding a preferred composition or range of compositions. Instead, all known natural and synthetic zeolites are claimed, and in addition, porous metal oxides are included.

U.S. Pat. No. 5,685,172 describes a process for the purification of oxygen and carbon dioxide from a cold gas or liquid stream of at least 90 mol percent of nitrogen, helium, neon, argon, krypton, xenon, or a mixture of these gases. To achieve this, the use of a porous metal oxide, such as hopcalite-like materials are required. The regeneration of these metal oxides requires a reducing agent, such as hydrogen, which increases the total operating cost of adsorption processes using these materials. The zeolites described in the present invention are structurally, compositionally and functionally different to hopcalite and do not require use of reducing agents for regeneration. More specifically, hopcalites are chemisorbents or catalysts whereas zeolites, however, are reversible physical adsorbents. In addition, hopcalite materials are largely non-crystalline. Any crystallinity associated with hopcalite comes from the $MnO_2$ component, which is present mainly in the amorphous form. In contrast, zeolites are crystalline materials.

U.S. Pat. No. 6,083,301 describes a PSA or TSA process for purifying inert fluids to at most 1 part per billion impurities for use in the field of electronics. This document describes the use of a hopcalite-like adsorbent for the capture of oxygen impurities from liquid streams.

Drawbacks associated with the related art include the use of hopcalite-like chemisorbents or catalysts that require the use of hydrogen as a reducing agent, which are costly, and do not possess the required physio-chemical properties needed for simple adsorbent regeneration. The adsorbents of the present invention are much easier to regenerate. In cases where full scale commercial argon purification is needed, affordable capital expenditures are required for the purification process. The purification level achieved using the adsorbent compositions of the present invention, is typically sufficient and acceptable for the majority of argon end-users.

The advantages taught in the present invention include using a superior crystalline microporous solid with a high oxygen capacity and an argon capacity that has been engineered to be as low as possible. This adsorbent would enhance the separation process versus the broader pore size distribution inherent for amorphous carbon. Moreover, the adsorption performance for the removal of oxygen from argon is closer to that of molecular sieving, than kinetic separation. As a result, process cycle times (or gas contact times) can be extremely long (i.e. 7 days or more depending on the feed concentration and process conditions) which is advantageous from the standpoint of economic feasibility.

In short, there are several limitations associated with the commercial purification of argon using adsorption compositions and techniques that have been discussed in the related art for certain applications. Additionally, we have determined missing information or data that was never known or published in the past, for example, in the '028 patent described above. According to the present invention and the argon adsorption uptake kinetics and capacity tests performed on lithium exchanged 4A zeolites, it is shown that samples with high lithium exchange levels (i.e. greater than or equal to 88 percent) possess an argon uptake rate and capacity well beyond that previously described and/or documented such that these adsorbents will not be effective in the purification. These known adsorbents and associated processes have been deficient in meeting all the criteria addressed above, namely: delivering argon as a liquid with very low oxygen concentrations in an economic, lower energy consuming process.

In summary, these previous adsorption compositions and related processes are not optimized for large scale operation in ASUs that produce up to a couple of hundred tons of liquid argon on a daily basis. Unmet needs remain regarding large scale liquid argon purification with low parts per million levels (down to or below 1 part per million is desirable) of oxygen using adsorption technology that also includes the development of an optimal, economic, and effective adsorbent. This includes finding adsorbents with the maximum capacity for oxygen uptake and negligible uptake for argon, which specifically enables the use of smaller adsorbent beds and/or longer process cycle times.

To overcome the disadvantages of the related art, it is an object of the present invention to provide a novel argon purification adsorbent composition for use during the argon purification process. The adsorbent must also be capable of being effectively regenerated to remove most of the adsorbed oxygen, by warming with a nitrogen or argon purge to above cryogenic temperatures.

SUMMARY OF THE INVENTION

According to an aspect of the invention, an optimal adsorbent composition is described that allows for the purification of at least one feed component from a fluid feed stream such that the adsorbent has an oxygen capacity of at least 10 weight percent. More specifically, the present invention describes a material for purification of a fluid feed stream comprising an adsorbent having an oxygen to argon selectivity greater than or equal to a ratio of 3:1 and an oxygen capacity of greater than or equal to 10 weight percent, wherein the oxygen capacity is measured at a pressure in the range of about 9-10 Torr and a temperature of 77 degrees Kelvin after 4 hours of equilibration time and wherein the oxygen to argon selectivity is obtained by dividing the oxygen capacity by the argon capacity of the adsorbent measured at a pressure in the range of about 697-700 Torr and a temperature of 87 degrees Kelvin after 8 hours of equilibration time. The adsorption capacities are measured on a pure component basis.

More specifically, the adsorbent composition used for separation of at least one feed component, including oxygen at feed concentrations of less than 1 percent, from a fluid feed stream, including an argon fluid feed stream, is a zeolite partially ion exchanged with lithium to create a pore size smaller than type 4A and larger than type 3A zeolites. The preferred ranges of lithium ion exchange are from 15 to 55 percent and/or 82 to 86 percent on a charge equivalent basis, with the balance being substantially sodium. The use of adsorbents having these aforementioned compositions results in oxygen to argon selectivity of greater than or equal to a ratio of 3:1 and often greater than 7:1.

BRIEF DESCRIPTION OF THE DRAWINGS

The objectives and advantages of the invention will be better understood from the following detailed description of the preferred embodiments thereof in connection with the accompanying figures wherein like numbers denote the same features throughout and wherein.

DETAILED DESCRIPTION OF THE INVENTION

Figure 1:
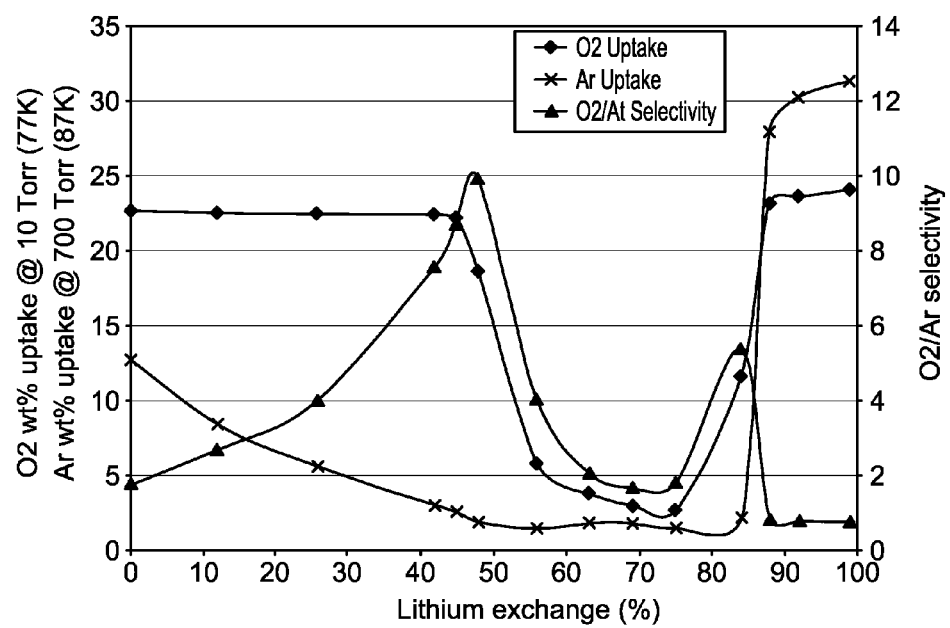
FIG. 1 is a plot of oxygen uptake, argon uptake and oxygen to argon selectivity of 1.0 mm zeolite 4A adsorbent ion exchanged with different amounts of lithium ions.

The present invention describes a molecular sieve adsorbent composition having a pore size which is in-between those of commercially available adsorbents 4A zeolite (sodium ion-based with a nominal pore size of approximately 4 Å) and 3A zeolite (potassium ion-based with a nominal pore size of approximately 3 Å). This type of zeolite or molecular sieve is needed for applications where the pore size of commercially available 3A is too small and 4A is too large in that no separation or purification, based on size of the atoms or molecules to be separated, takes place. The use of these commercial adsorbents leads to a low working capacity and selectivity resulting in impractical and uneconomical commercial adsorption processes and systems. Moreover, for a size-based or kinetic separation, it is desirable to be able to modify and even fine tune the pore size and thereby optimize the working capacity and/or selectivity to accommodate different process conditions including; operating temperatures and pressures, as well as different feed stream compositions.

The present invention concerns the surprising feature that when Zeolite 4A is ion exchanged with lithium at levels between 15 and 86 percent on a charge equivalent basis, the pore size, as measured by gas adsorption tests using oxygen and argon, steadily contracts as a function of the degree of lithium exchange up to approximately 75 percent. Thereafter, as the degree of lithium exchange is increased still further, the zeolite A pore size increases once again, up to a value which is greater than or equal to the 4A starting material, when the degree of Li exchange is about 88 percent and above. By adjusting the percentage of lithium partial ion exchange levels, adsorbents with a smaller or larger pore size can be created. Even though lithium exchanged zeolite A adsorbents have been previously described, the controlled phenomenon concerning the pore size reduction, and later expansion, as a function of the lithium ion exchange level has not been previously recognized. In addition, the ability to control and tune the pore size by adjustment of the percentage of lithium was also unknown. Furthermore, it is shown how this pore size modification method can be used to make superior adsorbents for the purification of liquid argon feed streams that contains oxygen in less than or equal to 1 percent (10,000 parts per million) concentrations. Often, removal of the oxygen to less than or equal to 10 parts per million and preferably less than or equal to 1 part per million is required for commercial purposes.

It has been found that when the lithium ion exchange level is in the range of 15 to 86 percent, the adsorbent pore size is surprisingly contracted when compared with the same adsorbent at lithium ion exchange levels outside of this preferred range. The crystalline microporous solid is preferably in an agglomerated form, with a mean particle diameter in the range 0.4 to 1.8 mm. It is most preferable to agglomerate the crystalline microporous solid into a beaded form. In particular, for the purification of an argon feed stream, for achieving no greater than 10 parts per million oxygen impurities and most preferably no greater than 1 part per million oxygen impurities, the preferred zeolite is a type A zeolite ion exchanged with lithium cations in the ranges of 15 to 55 and/or 82 to 86 percent on a charge equivalent basis and wherein the non-lithium charge-balancing counter cations are substantially sodium. The adsorbent described above when ion exchanged with the preferred ranges of lithium cations yields materials having the adsorption parameters for oxygen and argon as more clearly defined in Table 1.

TABLE 1

Key Adsorbent Parameters for Purification of Argon from Oxygen Contaminants

| Adsorbent Characteristics | Acceptable Values | Preferred Values | Most Preferred Values |
| --- | --- | --- | --- |
| $O_2$ Capacity (wt %)[1] | ≥10 | ≥15 | ≥15 |
| $O_2$/Ar Selectivity[2] | ≥3 | ≥4 | ≥7 |
| Mean Particle Size (mm)[3] | ≤1.8 | 0.6-1.2 | 0.4-1.2 |
| Particle Geometry | Beaded | Beaded | Beaded |

[1]$O_2$ capacity in wt % is measured in a pressure range of about 9-10 Torr, and 77 degrees K after 4 hours of equilibration time
[2]$O_2$/Ar selectivity is obtained by dividing the $O_2$ capacity in weight percent by the Ar capacity in wt % wherein the $O_2$ capacity in wt % is measured at a pressure range of about 9-10 Torr, and 77 degrees K after 4 hours of equilibration time and the Ar capacity in wt % is measured at pressure in the range of about 697-700 Torr, and 87 degrees K after 8 hours of equilibration time
[3]Mean particle size in mm is determined from a screening analysis, familiar to those skilled in the art.

In addition, the present invention identifies the critical performance factors which are required for the use of a molecular sieve adsorbent for separation or purification of a gas or liquid feed stream where at least one of the feed components is adsorbed and the remaining gas or liquid component(s) are substantially less adsorbed. In particular, identified here within are factors required to significantly improve the purification performance of adsorbents for removal of low quantities of oxygen (i.e. ≤1%) in liquid argon streams. It is shown that, for example, by maximizing the oxygen capacity, and simultaneously maximizing the oxygen/argon selectivity (e.g. by minimizing the argon capacity or by increasing the oxygen capacity still further, while leaving the argon capacity unchanged), one is led to enhanced performance in the purification of liquid argon streams. The necessity of the adsorbent to at least achieve the acceptable range in both oxygen capacity and oxygen to argon selectivity parameters has been verified in breakthrough tests under process relevant conditions. Results prove that purification of a liquid argon feed stream initially containing 1,000 parts per million oxygen impurities are reduced to the required oxygen impurity concentrations of at most 1 part per million.

The selective ion exchange of type 4A zeolites with lithium within the overall range from about 15 to 86 percent lithium, wherein pore size reduction is achieved, has been identified in the present invention. This technique provides for increasing the performance of zeolites of type A to meet the performance characteristics (Table 1 above), demonstrated to be necessary to extend the cycle time of the argon purification processes beyond that which is achievable using conventional 4A zeolites and/or reduce the adsorption bed size, compared to that required when 4A zeolites are used.

One surprising result that has been achieved is that when zeolite 4A is partially ion exchanged with 15 to 86 percent lithium on a charge equivalent basis, where the balance is substantially sodium, the adsorbent pore size is decreased to an optimum value in two separate, narrow ranges namely 15 to 55 and 82 to 86 percent. In general the teachings seem to contravene these surprising results. This lack of clarity includes information provided in textbooks. For example, in the well-known textbook "Zeolite Molecular Sieves by D. W. Breck (Published by John Wiley & Sons 1984, ISBN 0-89874-648-5), page 638, a lithium ion exchanged zeolite A is provided as an example of an aperture contraction by cation effect to the extent that oxygen is not adsorbed at −183° C. The results described herein indicate that lithium exchanged zeolite A adsorbs more oxygen than the parent sodium based zeolite A—in direct contradiction to the results described by Breck. Breck's premise regarding pore aperture reduction was based on unit cell contraction and his assertion is that in the presence of more lithium there would be even further contraction in unit cell dimensions. Clearly the variable and controllable nature of the aperture size, as a function of the degree of lithium exchange and the impact of this on the oxygen capacity and oxygen to argon selectivity resulting therefrom, which is a fundamental premise of the current invention, was not recognized by Breck.

The preparation of the adsorbent composition of the present invention is now described in detail. Adsorbents of the present invention are prepared from zeolite "4A" starting materials. The term "4A" is understood to be zeolite Linde Type A material, having a $SiO_2$ to $Al_2O_3$ ratio of about 2:1, such that the charge balancing cation is predominantly sodium (Na). The zeolite 4A starting material is normally in the form of a microcrystalline powder, or in an agglomerated form such as a bead or pellet—with or without the co-presence of a binding agent. The zeolite 4A must be of acceptable purity and crystallinity as determined by X-ray diffraction measurements or by other comparable methods. Essentially any zeolite 4A starting material can be used to meet the criteria described above. While zeolites having the Linde Type A framework structure are particularly preferred due to their widespread availability, low cost, adequate thermal and hydrothermal stability and comparatively small pore size, one skilled in the art will realize that other zeolites structures could be used to obtain similar results. In terms of selection of the zeolite structure, additional criteria are required. Zeolites having their largest pore openings or cage openings defined by rings of at most 10 tetrahedral coordinated atoms of the silicon and/or aluminum atom types, and most preferably by rings of at most 8 tetrahedral coordinated atoms of silicon and/or aluminum atom types, should be used. An additional criteria is that the zeolite selected for the purification, have a low silica to alumina ratio, preferably less than or equal to a 4:1 ratio. Zeolites having low silica to alumina ratio framework compositions possess large cation exchange capacities (i.e. can accommodate greater amounts of cations within their structures). Zeolites with large cation contents are thus preferred since zeolites of this type can have more cations per unit cell (the smallest building unit of the structure) and are therefore more susceptible to having their selectivities and capacities enhanced by the partial ion exchange method. The type A zeolite, which is described above, meets these zeolite selection criteria. The largest pores and cage openings of the A type zeolite are defined by rings having at most 8 tetrahedral coordinated atoms of the silicon and/or aluminum atom types and the silica to alumina ratio of standard commercial zeolite A products is close to a 2:1 ratio.

In order to create the adsorbents of the present invention, the zeolite 4A starting material must be ion exchanged with lithium in a very controlled manner. The objective of the lithium ion exchange step is to introduce the required amount of lithium in such a way so that a high degree of homogeneity is achieved throughout the zeolite. The zeolite pore size is controlled by the degree of lithium ion exchange and, therefore, if the ion exchange process is not well controlled a wider "spread" in the percentage of lithium is achieved, leading to an unwanted broader distribution of different pore sizes. In the ideal case, the lithium ion exchange step will be controlled so as to yield an equivalent degree of the percentage of lithium ions contained in every zeolite crystallite. This will concurrently produce a zeolite (adsorbent product) with a consistent pore size. In practical terms, it is difficult to obtain a commercial product having an identical lithium ion percentage in every zeolite crystallite due to the concessions that must be made to produce industrial quantities of zeolite adsorbents. For the purposes of the current invention, preferred ion exchange processes are those that achieve a variance in the percent lithium ion exchange within ±2 percent of the target value (e.g. for a target ion exchange level of 40 percent, the ion exchange process is preferably controlled to yield products with lithium ion exchange levels in the range from 38 to 42 percent). An example of a suitable process includes a batch ion exchange method where a fixed amount of lithium ion exchange solution is used and contacted with the zeolite 4A starting material for sufficient time such that equilibrium is eventually reached. Once equilibrium has been established, the ion exchange processes can be stopped.

Another variant of the batch process involves calculating the required amount of lithium from an ion exchange isotherm, dividing the amount of lithium by 3 and performing a total of 3 batches, each time providing only ⅓ of the required lithium. Using more than one batch helps increase the degree of homogeneity of the ion exchange. Once more, variations of the ion exchange process described here can be used provided they meet homogeneity requirements of controlling the variance in the percentage of lithium ion exchange to within +/−2 percent of the target value. Column ion exchange methods, wherein the zeolite 4A starting material is loaded into an ion exchange column and a lithium ion exchange solution is passed through the column to carry-out the ion exchange, may also be employed to produce the lithium ion exchanged adsorbent compositions of the present invention. In the column ion exchange method, the solution composition, solution concentration and column ion exchange process variables including column temperature, solution amount and flow rate can be used to control the extent of lithium ion exchange to obtain the adsorbent compositions taught herein.

After the ion exchange step, the lithium ion exchanged product should be washed so that it is essentially free of any residual salts. If lithium chloride (LiCl) is used as the source of lithium, then the established silver nitrate ($AgNO_3$) test for chloride species can be used to monitor the washing step and confirm that residual salts have been essentially removed. Finally, the product should be activated to remove any removable components, especially water. The objective of the activation processes is to decrease the residual moisture content to less than or equal to 1 weight percent without effecting any significant hydrothermal and/or other form of damage to the adsorbent which can reduce the adsorption capacity and/or selectivity of the adsorbent. Any process which meets these objectives may be used within the scope of the present invention.

Adsorbent Characterization: Adsorption Measurements Using Pure Component Oxygen and Argon Test Gases The adsorbent compositions of the present invention have been characterized using pure component oxygen and argon test gases at cryogenic temperatures where these two gases have similar sizes, but where there is enough size differentiation so that an adsorbent with an optimized micropore size can be used to achieve some degree of separation. Under the test conditions of the present invention, the results of which are shown in FIG. 1 and summarized in Table 2 below, oxygen behaves as the smaller molecule and argon as the larger species. As a result, the argon adsorption capacity is a very good indicator of how large the zeolite pore is over the first part of the pore size range of interest (i.e. approximately 4 Å to approximately 3 Å) and thereafter the oxygen capacity can be used to distinguish the smaller pore sizes from which argon is essentially excluded, at least over the duration of the test measurements.

Certain definitions are necessary in order to describe the significance of the data provided below;
1. The oxygen capacity is defined, for the purposes of this invention, as the uptake of oxygen by the adsorbent at 77 degrees Kelvin and a pressure in the range of about 9-10 Torr, after 4 hours of equilibration time.
2. The argon capacity is defined, for the purposes of this invention, as the uptake of argon by the adsorbent at 87 degrees Kelvin and a pressure in the range of about 697-700 Torr, after 8 hours of equilibration time.
3. The oxygen to argon selectivity is defined as the oxygen uptake capacity in weight percent divided by the argon uptake capacity in weight percent. The capacities are measured at the conditions indicated above.

The critical parameters, oxygen capacity, and oxygen to argon selectivity define the important characteristics required by an adsorbent to ensure successful purification. These parameters can be measured using appropriate methods including both gravimetric and volumetric adsorption apparatuses. For the purpose of the data and measurements performed and reported herein, a McBain gravimetric balance, well known to those skilled in the art, was used throughout. A McBain balance uses linear displacement of a sample pan or bucket attached to a quartz glass spring to measure the quantity of gas adsorbed by a particular sample. The quartz glass spring is contained within a vertical glass tube which provides a controlled atmospheric space into which the test gas can be introduced under controlled temperature and pressure conditions. In the experiments described herein ~1 gram of sample was used for each of the McBain measurements.

The general procedure for a single sample measurement is as follows:
1. Bring the McBain apparatus to room pressure, take the "Empty Bucket Reading" (E) using a cathetometer or a similar suitable device.
2. Load ~1 gram of sample into the sample bucket, affix the glass tube surrounding the sample bucket and the quartz glass spring in place and take the "Before Activation Reading".
3. Evacuate the sample space within the glass tube surrounding the sample bucket and the quartz glass spring.
4. After the vacuum level has stabilized, heat each tube at a rate of 0.8 degrees Centigrade per minute to 400 degrees Centigrade, and hold the sample at this temperature for at least 6 hours, while continuing to evacuate the sample space to thoroughly degas the sample.
5. Cool the sample tube to room temperature and take the "Activation Reading" (A) using the cathetometer.
6. After the "Activation Reading" (A) has been taken, the sample should be cooled to the measurement temperature of 87 degrees Kelvin for the argon measurements or 77 degrees Kelvin for the oxygen measurements by immersing the sample tube in either liquid argon or liquid nitrogen respectively for 1 hour to stabilize the temperature.
7. For the oxygen measurements, expose each tube to oxygen at a pressure of 10 Torr and take the "Adsorption Reading" (F) using the cathetometer at the following time intervals: 5, 10, 30, 60, 120, 180 and 240 minutes. Oxygen uptake by the sample in a fixed volume results in a pressure decline. Therefore, the oxygen pressure was manually adjusted back to 10 Torr if it fell below 9 Torr during the measurements.
8. For the argon measurements, expose each tube to argon at a pressure of 700 Torr and take the "Adsorption Readings" (F) at the following time intervals: 30, 60, 120, 180, 240, 300, 360, 420, and 480 minutes. Argon uptake by the sample results in a pressure decline. The Ar pressure was maintained at a pressure of 700 Torr or slightly lower using an automated pressure controller that adjusted the pressure to 700 Torr if it fell below 697 Torr.
9. For the oxygen measurements, expose each tube to oxygen at a pressure of 10 Torr and take the "Adsorption Reading" (F) using the cathetometer at the following time intervals: 5, 10, 30, 60, 120, 180 and 240 minutes.
10. For the argon measurements, expose each tube to argon at a pressure of 700 Torr and take the "Adsorption Readings" (F) at the following time intervals: 30, 60, 120, 180, 240, 300, 360, 420, and 480 minutes
11. In between the oxygen and argon measurements on a given sample, bring the McBain system and sample tube back to a vacuum, allow the system to warm up to room temperature and wait for a sufficient time period until the sample returns to the "Activation Reading" value, before changing test gas, temperature, and pressure.

After the oxygen and argon measurements have been taken, the adsorption capacity for each test gas can be calculated using Equation 1:

$$\text{Gas Adsorption Capacity, mass-\%} = 100(A-F)/(E-A) \quad (1)$$

where:
A=Activation Reading, mm
E=Empty Bucket Reading, mm
F=Adsorption Reading, mm
100=conversion factor, mass/mass to mass-%

Applying Equation 1 to the oxygen data point obtained after 240 minutes (4 hours) of equilibration time, yields the oxygen capacity parameter used in the subject invention. Applying Equation 1 to the argon data point obtained after 480 minutes (8 hours) of equilibration time, yields the argon capacity for the oxygen to argon selectivity calculation. The oxygen to argon selectivity is calculated by dividing the oxygen capacity in units of wt % by the argon capacity similarly in units of wt %.

In FIG. 1, three curves for zeolite 4A adsorbent are shown as a function of the percentage of lithium ion exchanged, namely the oxygen uptake capacity at 77 degrees Kelvin and a pressure in the range of about 9-10 Torr, the argon uptake capacity at 87 degrees Kelvin and a pressure in the range of about 697-700 Torr and oxygen to argon selectivity. In FIG. 1, it is clear that the oxygen uptake (capacity) remains reasonably constant and thereafter declines with an increasing percentage of lithium ion exchanged up to an ion exchange level of about 75 percent. At 75 percent, the oxygen uptake capacity increases once again, returning to a similar value to that of the original (non-lithium exchanged baseline 4A zeolite), at an ion exchange level of greater than or equal to 86 percent. The oxygen to argon selectivity ratio shows a steady increase from about 2 for the baseline 4A zeolite to about 10, as the lithium ion exchange level is increased to about 48 percent. Thereafter, the selectivity rapidly decreases as the lithium ion exchange value increases above 48 percent due to the decreasing oxygen capacity. Another, surprising, increase in selectivity occurs, at ion exchange levels of 75 to 86 percent, due to a concurrent oxygen capacity increase. Above an ion exchange of about 86 percent, the selectivity decreases once again.

From the data in FIG. 1, which has been tabularized and summarized in Table 2 below, it is clear that the adsorption properties, as determined by the two parameters defined above, (oxygen capacity and oxygen to argon selectivity) exhibit a non-obvious dependence on the lithium ion exchange level of the zeolite 4A.

TABLE 2

Correlation of Oxygen to Argon Selectivity and Oxygen Capacity Thresholds to Ranges of Percent Lithium Ion Exchange Level in 4A Zeolite

| Select Parameters | [1]Selectivity (O$_2$/Ar) | [2]O$_2$ Capacity (wt %) | Li Exchange Level (%) Low Range | Li Exchange Level (%) High Range |
|---|---|---|---|---|
| 1 | ≥3 | ≥10 | 15-55 | 82-86 |
| 2 | ≥3 | ≥15 | 15-50 | 85 |
| 3 | ≥4 | ≥10 | 25-55 | 82-86 |
| 4 | ≥4 | ≥15 | 25-50 | 85 |
| 5 | ≥5.5 | ≥15 | 34-50 | 85 |
| 6 | ≥7 | ≥15 | 39-50 | Not Achieved |

[1]O$_2$/Ar selectivity is obtained by dividing the O$_2$ capacity in weight percent by the Ar capacity in wt % wherein the O$_2$ capacity in wt % is measured at a pressure in the range of about 9-10 Torr, and 77 degrees K after 4 hours of equilibration time and the Ar capacity in wt % is measured at a pressure in the range of about 697-700 Torr, and 87 degrees K after 8 hours of equilibration time
[2]O$_2$ capacity in wt % is measured at 9-10 Torr, and 77 degrees K after 4 hours of equilibration time Application of the Partial Li Exchange Modification Method to Make Improved Adsorbents for the Purification of Cryogenic Argon Streams to Remove Trace Concentrations of Oxygen Zeolites of type A and especially type 4A as suitable adsorbents for removal of low concentration of oxygen impurities from cryogenic argon streams are well known. Ion exchanged zeolite A compositions being equivalent to zeolite 4A have also been previously described, as discussed above, but there are no disclosures describing improved performance for ion exchanged compositions in the ranges provided herein. In terms of an ideal adsorbent for the separation of oxygen from argon, under cryogenic conditions in the liquid (or at least fluid) state, it is beneficial to identify and provide a composition where the oxygen uptake capacity is high, and wherein the oxygen/argon selectivity is also high. Again, as shown by the data presented in FIG. 1, it is clear that the 4A zeolite, as modified herein, possesses a relatively high oxygen capacity, but at the same time, the argon uptake capacity is also significant which leads to a low oxygen/argon selectivity of about 2 for this baseline material. From these data, we can conclude that the pore size of 4A is large enough to adsorb both oxygen and argon into its micropore space which is detrimental from the standpoint of achieving long cycle times and/or small adsorption bed sizes for the subject purification.

In further reviewing the adsorption data presented in FIG. 1, it is clear that initially, as the percentage of lithium ion exchange is increased by the ion exchange process, the capacity for argon adsorption is observed to decrease, while the oxygen capacity is substantially unaffected. When the percentage of lithium ion exchanged reaches the range of 15 to 55 percent, the selectivity is significantly improved with respect to the zeolite 4A. At lithium ion exchange levels above 55 percent, the oxygen uptake capacity is observed to decrease to less than 10 weight percent and therefore it is preferred to keep the ion exchange levels below this threshold value. There is also, however, a second region of improved selectivity for oxygen that is obtained when the percentage of lithium ion exchanged is in the range of 82 to 86 percent. Zeolite 4A adsorbents having these compositions are also beneficial for this purification process.

Figure 2A:
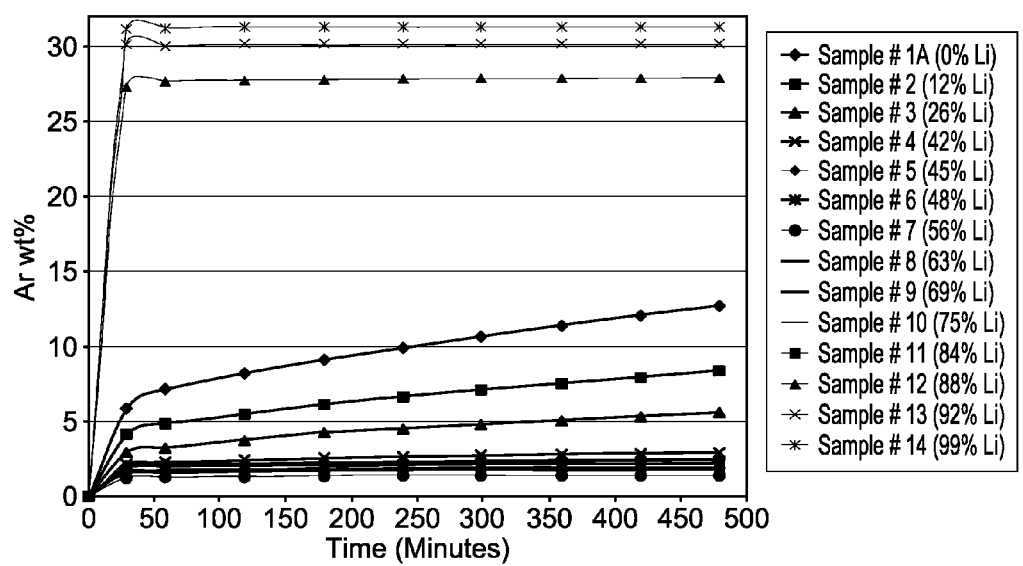
FIG. 2A is a plot of argon uptake curves versus time for 1.0 mm zeolite 4A adsorbent ion exchanged with different amounts of lithium ions with samples tested at a temperature of 87 degrees Kelvin and a pressure in the range of about 697-700 Torr.

As shown in FIG. 2A, a significant percentage of the argon uptake is realized during the first 30 minutes of equilibration or exposure time. At this point, any larger mesopores/macropores in the (lithium ion exchanged and baseline) adsorbents are deemed to be essentially filled, and any adsorption that follows, takes place predominantly within the adsorbent micropores and the uptake rate and capacity attained therein is controlled by the size of the micropores. At lithium ion exchange levels above 86 percent in the 4A zeolite, even the micropores are large enough to become filled with argon during the first 30 minutes of exposure.

Figure 2B:
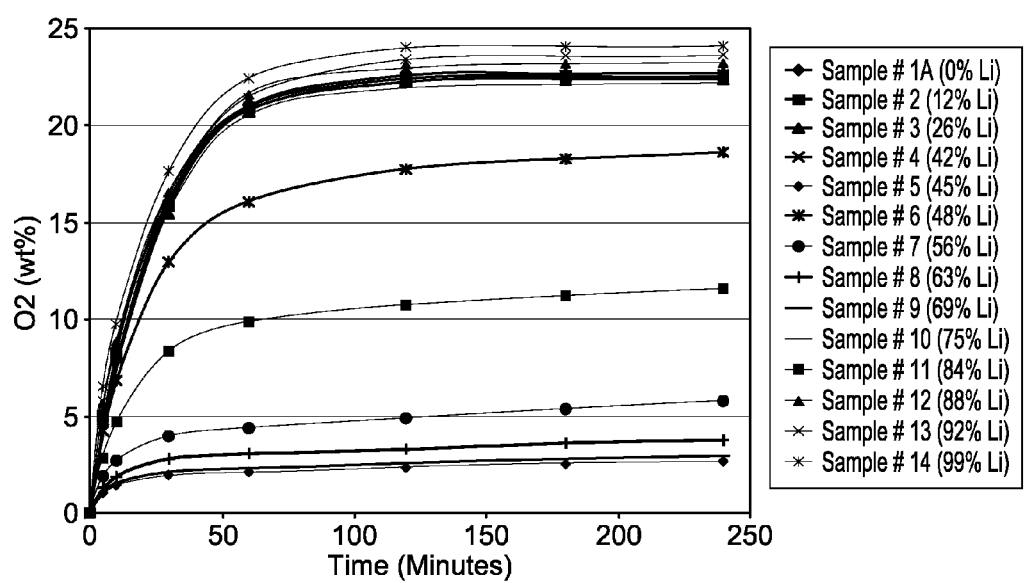
FIG. 2B is a plot of oxygen uptake curves versus time for 1.0 mm zeolite 4A adsorbent ion exchanged with different amounts of lithium ions with samples tested at a temperature of 77 degrees Kelvin and a pressure in the range of about 9-10 Torr.

As shown in FIG. 2B, samples with 55 to 75 percent lithium ion exchange do not exhibit significant oxygen capacity—far below the threshold required for the present invention after the specified four hours of equilibration time. Outside of this range and at the same four hours of equilibration time, the oxygen capacity requirements are clearly met.

In Table 3 below, the oxygen capacity, and oxygen to argon selectivity are compared for 4A and several lithium ion exchanged 4A materials. The data shows that the oxygen capacity criterion of greater than or equal to 10 wt % and oxygen/argon selectivity criterion of at least 3 are met for lithium exchanged zeolites of type 4A having 15 to 55 percent lithium and 82 to 86 percent lithium, on a charge equivalent basis. It is more preferred to achieve an oxygen capacity of 15 weight percent and an oxygen to argon selectivity ratio of at least 4. This more preferred range has been achieved by controlling the percentage of lithium ion exchanged to be within a range of 25 to 50 percent and/or to be about 85 percent on a charge equivalent basis. It is most preferred to achieve an oxygen capacity of at least 15 weight percent and an oxygen to argon selectivity ratio of at least 7. This most preferred range is achieved by controlling the percentage of lithium ion exchanged to be within a range of 39 to 50 percent on a charge equivalent basis When the degree of lithium exchange is controlled to be within the most preferred range, for example ~42% lithium ion exchanged zeolite 4 A (See Sample 4 below and the preparation described therein), the corresponding breakthrough time to 1 part per million of oxygen is 17.5 hours compared to 11 hours for the baseline starting material—type 4A zeolite (the feed argon liquid was initially contaminated with 100 parts per million of oxygen for these tests). The method and apparatus used to perform the breakthrough experiment using the lithium ion exchanged zeolite 4A of the present invention is fully described in the co-pending application entitled "Purification of Argon through Liquid Phase Cryogenic Adsorption" co-filed on Mar. 1, 2013 as Dckt. No. 13030 and incorporated herein by reference in its entirety.

TABLE 3

Oxygen and Argon Adsorption Measurements on Partially Lithium Ion Exchanged Zeolite 4A Adsorbents

| Sample No. | Lithium Ion Exchange Level of 4A Zeolite (%) | $O_2$ Capacity (wt %)[1] | Ar Capacity (wt %)[2] | $O_2$/Ar Selectivity[3] |
|---|---|---|---|---|
| Sample 1A | 0 | 22.67 | 12.72 | 1.78 |
| Sample 2 | 12 | 22.53 | 8.40 | 2.68 |
| Sample 3 | 26 | 22.46 | 5.61 | 4.00 |
| Sample 4 | 42 | 22.41 | 2.96 | 7.57 |
| Sample 5 | 45 | 22.19 | 2.55 | 8.70 |
| Sample 6 | 48 | 18.61 | 1.88 | 9.92 |
| Sample 7 | 56 | 5.81 | 1.44 | 4.02 |
| Sample 8 | 63 | 3.78 | 1.82 | 2.07 |
| Sample 9 | 69 | 2.99 | 1.79 | 1.67 |
| Sample 10 | 75 | 2.70 | 1.50 | 1.80 |
| Sample 11 | 84 | 11.61 | 2.16 | 5.38 |
| Sample 12 | 88 | 23.18 | 27.91 | 0.83 |
| Sample 13 | 92 | 23.63 | 30.23 | 0.78 |
| Sample 14 | 99 | 24.08 | 31.31 | 0.77 |

[1]$O_2$ capacity in wt % is measured at a pressure in the range of about 9-10 Torr, 77 degrees Kelvin after 4 hours of equilibration time
[2]Ar capacity in wt % is measured at a pressure in the range of about 697-700 Torr, 87 degrees Kelvin after 8 hours of equilibration time
[3]$O_2$/Ar selectivity is obtained by dividing the $O_2$ capacity in weight percent by the Ar capacity in wt %

Characterization of Sample 1 (Commercially Produced 4A+12% Actigel)

A commercially produced 4A sample in beaded form, having an average particle size of 1.0 mm was obtained from Zeochem LLC and was provided to act as a baseline reference (control) sample. The 1.0 mm (16×20 mesh) sample was characterized by the pure component oxygen and argon adsorption measurements, as described above in the section entitled "Adsorption Characterization: Adsorption Measurements using Pure Component Oxygen and Argon Test Gases".

Preparation of Sample 1A (De-Ionized Water Wash of 4A+12% Actigel)

The baseline sample (Sample 1) was further developed using the following procedure: a column wash process was used where 470 g of the material on a dry weight basis (591 g wet weight) was packed inside a glass column (dimensions: 2-inch i.d.) and contacted with de-ionized water at 90 degrees Centigrade at a flow rate of 27 ml/min for 7½ hours. The feed flow rate of the de-ionized water was then increased to 85 ml/min at 85 degrees Centigrade for an additional 95 minutes. The beads were removed, air dried, screened to the 16×20 mesh size, then activated using a shallow tray calcination method using a General Signal Company Blue M Electric oven equipped with a dry air purge. The adsorbents were spread out in stainless steel mesh trays to provide a thin layer of less than 0.5 inches in depth. A purge of 200 SCFH of dry air was fed to the oven during calcination. The temperature was set to 90 degrees Centigrade followed by a 360-minute dwell time. The temperature was then increased to 200 degrees Centigrade gradually over the course of a 360-minute period (approximate ramp rate was equal to 0.31 degrees Centigrade/minute), and then further increased to 300 degrees Centigrade over a 120-minute period (approximate rate is equal to 0.83 degrees Centigrade/min) and finally increased to 450 degrees Centigrade over a 180-minute period (approximate ramp rate equals 1.63 degrees Centigrade/min) and held at this temperature for 45 minutes. The product beads were characterized as described for Sample 1 above.

Preparation of Sample 2 (Partial Lithium Exchange of 4A+12% Actigel—12% Li ion exchanged)

A partial lithium ion exchange of Sample 1A was achieved using the following procedure: A column ion exchange process was used where 470 g of 4A+12% Actigel (16×20 mesh) on a dry weight basis (591 g wet weight) were packed inside a glass column (dimensions: 2-inch i.d.) and contacted with a 1 molar solution consisting of 0.55 molar lithium chloride (LiCl) and 0.45 molar sodium chloride (NaCl) at 90 degrees Centigrade at a flow rate of 27 ml/min for 7½ hours. A preheating zone prior to the adsorbent packed column ensured that the solution temperature had reached the target value prior to contacting the zeolite sample. After the required amount of solution was pumped through the column containing the sample, the feed was switched to de-ionized water to remove excess LiCl and NaCl from the sample. A water volume of 8 L at 85 degrees Centigrade and a flow rate of 85 ml/min was used. A silver nitrate ($AgNO_3$) test, familiar to those skilled in the art, was used to verify that the effluent was essentially chloride free, at the end of the washing stage. The product beads were removed, air dried, and screened to the 16×20 mesh size and calcined using the methods and equipment described for Sample 1A above. The product beads were characterized as also described in Baseline Sample 1. Chemical analysis of the lithium ion exchanged product using standard ICP (Inductively Coupled Plasma Spectroscopy) methods known by those skilled in the art, yielded a lithium ion exchange level of 12 percent for this sample on a charge equivalent basis. Results for all samples are tabulated in Table 3 above.

Preparation of Sample 3 (Partial Lithium Exchange of 4A+12% Actigel—26% Lithium Ion Exchanged)

A partial lithium ion exchange of the sample was achieved using the same procedure as for Sample 2, with the exception that the ion exchange solution consisted of 0.70 molar lithium chloride (LiCl) and 0.30 molar sodium chloride (NaCl). In this case, chemical analysis of the lithium exchanged product using standard ICP (Inductively Coupled Plasma Spectroscopy) yielded a higher lithium exchange level of 26 percent for this sample on a charge equivalent basis.

Preparation of Sample 4 (Partial Lithium Exchange of 4A+12% Actigel—42% Lithium Ion Exchanged)

A partial lithium ion exchange of the sample was achieved using the same procedure as for Sample 2 with the exception that the ion exchange solution consisted of 0.78 molar lithium chloride (LiCl) and 0.22 molar sodium chloride (NaCl). In this case, chemical analysis of the lithium exchanged product using standard ICP (Inductively Coupled Plasma Spectroscopy) yielded a higher lithium exchange level of 42 percent for this sample on a charge equivalent basis.

Preparation of Sample 5 (Partial Lithium Exchange of 4A+12% Actigel—45% Lithium Ion Exchanged)

A partial lithium ion exchange of the sample was achieved using the same procedure as for Sample 2 with the exception that the ion exchange solution consisted of 0.805 molar lithium chloride (LiCl) and 0.195 molar sodium chloride (NaCl). In this case, chemical analysis of the lithium exchanged product using standard ICP (Inductively Coupled Plasma Spectroscopy) yielded a higher lithium exchange level of 45 percent for this sample on a charge equivalent basis.

Preparation of Sample 6 (Partial Lithium Exchange of 4a 12% Actigel—48% Lithium Ion Exchanged)

A partial lithium ion exchange of the sample was achieved using the same procedure as for Sample 2 with the exception that the ion exchange solution consisted of 0.83 molar lithium chloride (LiCl) and 0.17 molar sodium chloride (NaCl). In this case, chemical analysis of the lithium exchanged product using standard ICP (Inductively Coupled Plasma Spectroscopy) yielded a higher lithium exchange level of 48 percent for this sample on a charge equivalent basis.

Preparation of Sample 7 (Partial Lithium Exchange of 4A+12% Actigel—56% Lithium Ion Exchanged)

A partial lithium ion exchange of the sample was achieved using the same procedure as for Sample 2 with the exception that the ion exchange solution consisted of 0.88 molar lithium chloride (LiCl) and 0.12 molar sodium chloride (NaCl). In this case, chemical analysis of the lithium exchanged product using standard ICP (Inductively Coupled Plasma Spectroscopy) yielded a higher lithium exchange level of 56 percent for this sample on a charge equivalent basis.

Preparation of Sample 8 (Partial Lithium Exchange of 4A+12% Actigel—63% Lithium Ion Exchanged A partial lithium ion exchange of the sample was achieved using the same procedure as for Sample 2 with the exception that the ion exchange solution consisted of 0.89 molar lithium chloride (LiCl) and 0.11 molar sodium chloride (NaCl). In this case, chemical analysis of the lithium exchanged product using standard ICP (Inductively Coupled Plasma Spectroscopy) yielded a higher lithium exchange level of 63 percent for this sample on a charge equivalent basis.

Preparation of Sample 9 (Partial Lithium Exchange of 4A+12% Actigel—69% Lithium Ion Exchanged)

A partial lithium ion exchange of the sample was achieved using the same procedure as for Sample 2 with the exception that the ion exchange solution consisted of 0.91 molar lithium chloride (LiCl) and 0.09 molar sodium chloride (NaCl). In this case, chemical analysis of the lithium exchanged product using standard ICP (Inductively Coupled Plasma Spectroscopy) yielded a higher lithium exchange level of 69 percent for this sample on a charge equivalent basis.

Preparation of Sample 10 (Partial Lithium Exchange of 4A+12% Actigel—75% Lithium Ion Exchanged)

A partial lithium ion exchange of the sample was achieved using the same procedure as for Sample 2 with the exception that the ion exchange solution consisted of 0.94 molar lithium chloride (LiCl) and 0.06 molar sodium chloride (NaCl). In this case, chemical analysis of the lithium exchanged product using standard ICP (Inductively Coupled Plasma Spectroscopy) yielded a higher lithium exchange level of 75 percent for this sample on a charge equivalent basis.

Preparation of Sample 11 (Partial Lithium Exchange of 4a 12% Actigel—84% Lithium Ion Exchanged A partial lithium ion exchange of the sample was achieved using the same procedure as for Sample 2 with the exception that the ion exchange solution consisted of 0.97 molar lithium chloride (LiCl) and 0.03 molar sodium chloride (NaCl). In this case, chemical analysis of the lithium exchanged product using standard ICP (Inductively Coupled Plasma Spectroscopy) yielded a higher lithium exchange level of 84 percent for this sample on a charge equivalent basis.

Preparation of Sample 12 (Partial Lithium Exchange of 4A+12% Actigel—88% Lithium Ion Exchanged)

A partial lithium ion exchange of the sample was achieved using the same procedure as for Sample 2 with the exception that the ion exchange solution consisted of 0.98 molar lithium chloride (LiCl) and 0.02 molar sodium chloride (NaCl). In this case, chemical analysis of the lithium exchanged product using standard ICP (Inductively Coupled Plasma Spectroscopy) yielded a higher lithium exchange level of 88 percent for this sample on a charge equivalent basis.

Preparation of Sample 13 (Partial Lithium Exchange of 4A+12% Actigel—92% Lithium Ion Exchanged A partial lithium ion exchange of the sample was achieved using the same procedure as for Sample 2 with the exception that the ion exchange solution consisted of 0.99 molar lithium chloride (LiCl) and 0.01 molar sodium chloride (NaCl). In this case, chemical analysis of the lithium exchanged product using standard ICP (Inductively Coupled Plasma Spectroscopy) yielded a higher lithium exchange level of 92 percent for this sample on a charge equivalent basis.

Preparation of Sample 14 (Lithium Exchange of 4A+12% Actigel—99% Lithium Ion Exchanged)

An essentially fully lithium ion exchanged 4A sample was achieved using the same procedure as for Sample 2 with the exception that the ion exchange solution consisted of 1.0 molar lithium chloride (LiCl). In this case, chemical analysis of the lithium exchanged product using standard ICP (Inductively Coupled Plasma Spectroscopy) yielded a higher lithium exchange level of 99 percent for this sample on a charge equivalent basis. With reference to FIG. 1 and Table 3, at significantly lower exchange levels (i.e. less than 15 percent lithium), the performance of the adsorbent of the present invention is similar to that of the 4A zeolite. At high lithium ion exchange levels of greater than or equal to 88 percent, the selectivity is drastically decreased. In fact, at these lithium ion exchange levels, the composition is less efficient than the original (non-exchanged) zeolite 4A.

To summarize, a need was established to develop an improved adsorbent having a pore size smaller than commercial grade adsorbent 4A and larger than commercial grade adsorbent 3A for appropriate size based separations and purifications of atoms and molecules. The removal of part per million quantities of oxygen from cryogenic argon streams, especially liquid argon streams, is an example of a purification process where an intermediate pore size is desirable. Adsorbents of the present invention offer the benefit of a more highly refined pore size, which has been accomplished by the partial lithium ion exchange modification of the zeolites described herein, especially type 4A zeolite. The improvement in pore size obtained in this way translates into higher selectivity and higher working capacity of the desired adsorbable component. In the case of oxygen removal from liquid argon streams, the greater oxygen working capacity, as well as improved selectivity towards oxygen, enables the process cycle time to be increased. This improvement corresponds to less frequent bed regeneration requirements (i.e. warming and re-cooling steps during a TSA process or pressurizing and depressurizing or vacuum steps in a (V)PSA process), thereby significantly lowering process operating costs. Alternatively, the greater oxygen bed working capacity and improved selectivity can be utilized to reduce the size of the adsorbent vessels, lower the adsorbent inventory and potentially decrease the size of other pieces of equipment, for a given fixed cycle time TSA or (V)PSA process.

The introduction of lithium ions into the zeolite A structure using ion exchange techniques led to the surprising discovery that the pore size of the zeolite can be controlled by the degree of lithium exchange and produces adsorbents having appropriate pore sizes to carry-out the purification of oxygen impurities from cryogenic argon streams with higher efficiency. Another surprising feature of this invention was the finding that the $O_2$/Ar selectivity has maxima in two distinct compositional ranges of percent lithium ion exchanged, a first range from about 15-55% and a second range from 82-86%. For the purification of a cryogenic argon stream from oxygen impurities of up to 1 percent, the most preferred composition is a lithium ion exchanged zeolite of type A with a lithium exchange level that is in the range from about 39-50 percent on a charge equivalent basis and wherein the counter balancing non-lithium cations are substantially sodium. For the aforementioned purification, the lithium ion exchanged zeolite adsorbent is preferably in the form of beads having a particle size or less than or equal to 1.8 mm and most preferably from 0.4 to 1.2 mm. The residual moisture content of the lithium ion exchanged zeolite is preferably less than about 1 weight percent.

Results for all samples are tabulated in Table 3 above. Other objects and aspects of the present disclosure will become apparent to one of ordinary skill in the art upon review of the specification, drawings, and claims appended hereto.

We claim:

1. A material for purification of a fluid feed stream comprising a zeolite adsorbent having a silica to alumina ratio of less than or equal to 4:1, and partially ion exchanged with either a first low range or second high range of lithium charged balancing cations and/or a mixture of the two wherein said zeolite has pores defined by ring structures comprising at most 10 tetrahedrally coordinated atoms of the silicon and/or aluminum types having an oxygen to argon selectivity greater than or equal to a ratio of 3:1 and an oxygen capacity of greater than or equal to 10 weight percent, wherein said oxygen capacity is measured at a pressure in the range of about of about 9-10 Torr and a temperature of 77 degrees Kelvin after 4 hours of equilibration time and wherein said oxygen to argon selectivity is obtained by dividing said oxygen capacity by said argon capacity of said adsorbent measured at a pressure in a range of about 697-700 Torr and a temperature of 87 degrees Kelvin after 8 hours of equilibration time.

2. The material of claim 1, wherein said oxygen to argon selectivity is greater than or equal to a ratio of 7:1.

3. The material of claim 1, wherein said fluid feed stream is a liquid feed stream.

4. The material of claim 1, wherein said adsorbent has an oxygen capacity of greater than or equal to 15 weight percent.

5. The material of claim 1, wherein said adsorbent has an argon capacity of less than or equal to 3 weight percent.

6. The material of claim 1, wherein said adsorbent is a lithium ion exchanged zeolite of type A wherein the non-lithium charge balancing counter cations are substantially sodium.

7. An adsorbent for purification of a fluid feed stream containing at least argon and oxygen by uptake of at least one feed component from said fluid feed stream, comprising: a zeolite adsorbent having a silica to alumina ratio of less than or equal to 4:1, and partially ion exchanged with either a first low range or a second high range of lithium charge balancing cations and/or a mixture of the two, wherein said first range contains between 15 and 55 percent and wherein said second range contains between 82 to 86 percent lithium charge balancing cations, wherein said zeolite has pores defined by ring structures comprising at most 10 tetrahedrally coordinated atoms of the silicon and/or aluminum types.

8. The adsorbent of claim 7, wherein said zeolite has a pore size smaller than type 4A zeolite and larger than type 3A zeolite.

9. The adsorbent of claim 7, wherein said zeolite has pores defined by rings comprising of at most 8 tetrahedrally coordinated atoms of the silicon and/or aluminum types.

10. The adsorbent of claim 7, wherein said fluid feed stream is a liquid feed stream.

11. The adsorbent of claim 7, wherein said zeolite is partially ion exchanged with 42 percent lithium charge balancing cations, and has an oxygen capacity of greater or equal to 20 weight percent, wherein the oxygen capacity is measured at in the range of about of about 9-10 Torr and a temperature of 77 degrees Kelvin after 4 hours of equilibration time.

12. An adsorbent for the purification process of a fluid feed stream comprising: a zeolite adsorbent having a silica to alumina ratio of less than or equal to 4:1, and partially ion exchanged with either a first low range or second high range of lithium charged balancing cations and/or a mixture of the two wherein said zeolite has pores defined by ring structures comprising at most 10 tetrahedrally coordinated atoms of the silicon and/or aluminum types having an oxygen to argon selectivity greater than or equal to a ratio of 3:1 and an oxygen capacity of greater than or equal to 10 weight percent, wherein said oxygen capacity is measured at a pressure in the range of about of about 9-10 Torr and a temperature of 77 degrees Kelvin after 4 hours of equilibration time, wherein said adsorbent is utilized in a fluid stream that is predominantly argon and less than or equal to 10,000 parts per million of oxygen, wherein the oxygen concentration after said purification process is completed, is less than or equal to 10 parts per million of oxygen in said fluid feed stream.

13. The adsorbent of claim 12, wherein said oxygen to argon selectivity is obtained by dividing said oxygen capacity by the argon capacity of the adsorbent, measured at a pressure in the range of about of about 697 to 700 Torr and a temperature of 87 degrees Kelvin after 8 hours of equilibration time.

14. The adsorbent of claim 12, wherein said first low range contains between 15 and 55 percent and wherein said second high range contains between 82 and 86 percent lithium charge balancing cations, and wherein the non-lithium charge balancing counter cations are substantially sodium.

15. The adsorbent of claim 14, wherein said adsorbent has an oxygen capacity of greater than or equal to 15 weight percent.

16. The adsorbent of claim 14, wherein said adsorbent has an argon capacity of less than or equal to 5 weight percent.

17. The adsorbent of claim 14, wherein said argon capacity is less than or equal to 3 weight percent.

18. The adsorbent of claim 14, wherein said oxygen to argon selectivity is greater than or equal to a ratio of 4:1.

19. The adsorbent of claim 14, wherein said oxygen to argon selectivity is greater than or equal to a ratio of 7:1.

20. The adsorbent of claim 14, wherein said zeolite is a type A zeolite.

21. The adsorbent of claim 14, wherein the silica to alumina ratio is about 2:1.

22. The adsorbent of claim 14, wherein said adsorbent is in the form of agglomerated particles having at most 20 weight percent of a binding agent.

23. The adsorbent of claim 22, wherein said binding agent is selected from the group consisting of; a kaolin, sepiolite, halloysite, and attapulgite clay, purified versions thereof and/or mixtures thereof.

24. The adsorbent of claim 22, wherein the mean particle size of said agglomerated adsorbent particles is less than or equal to 2.0 mm.

25. The adsorbent of claim 24, wherein the mean particle size of said agglomerated adsorbent particles is in the range of 0.4 to 1.2 mm.

* * * * *